Figure 1:
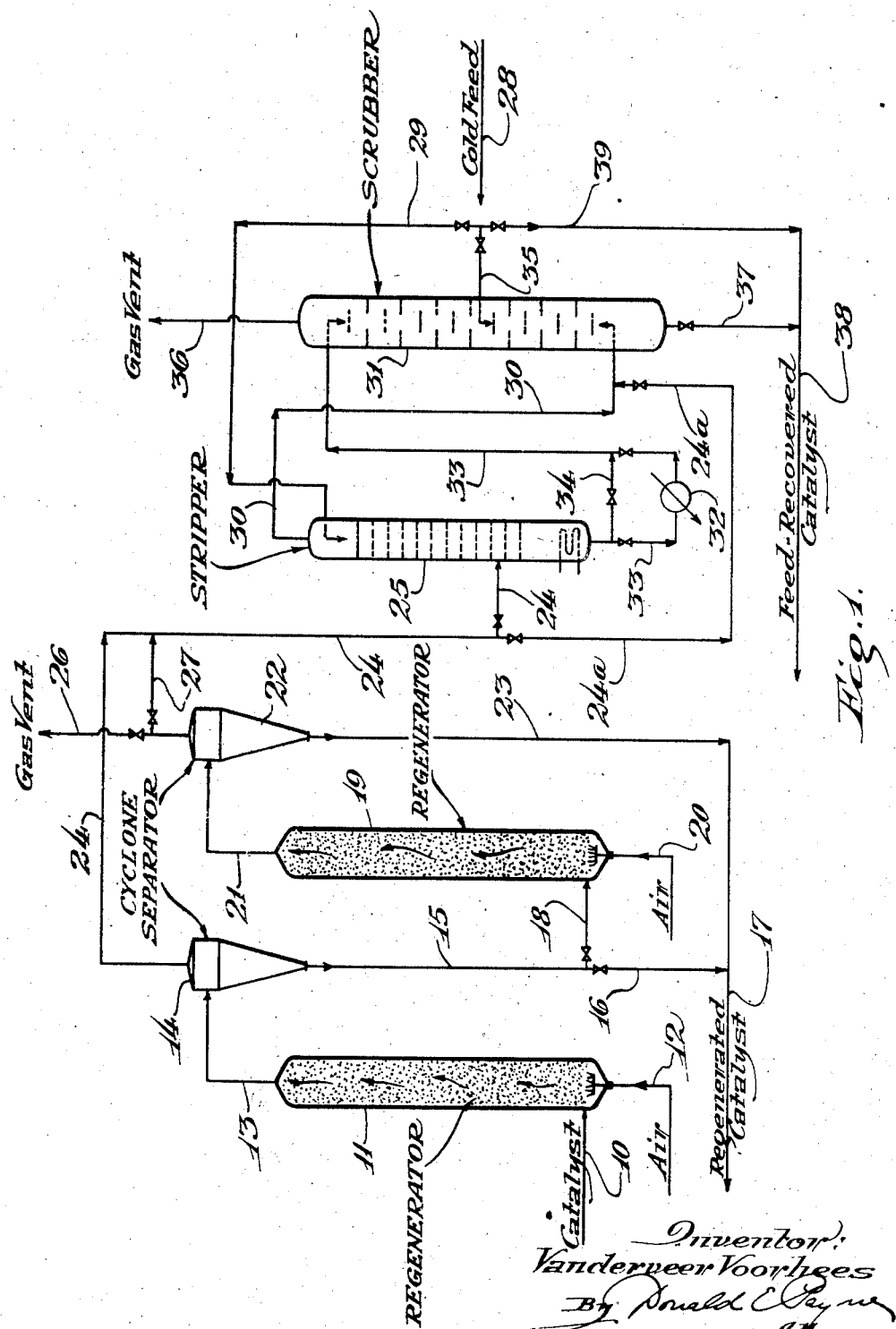

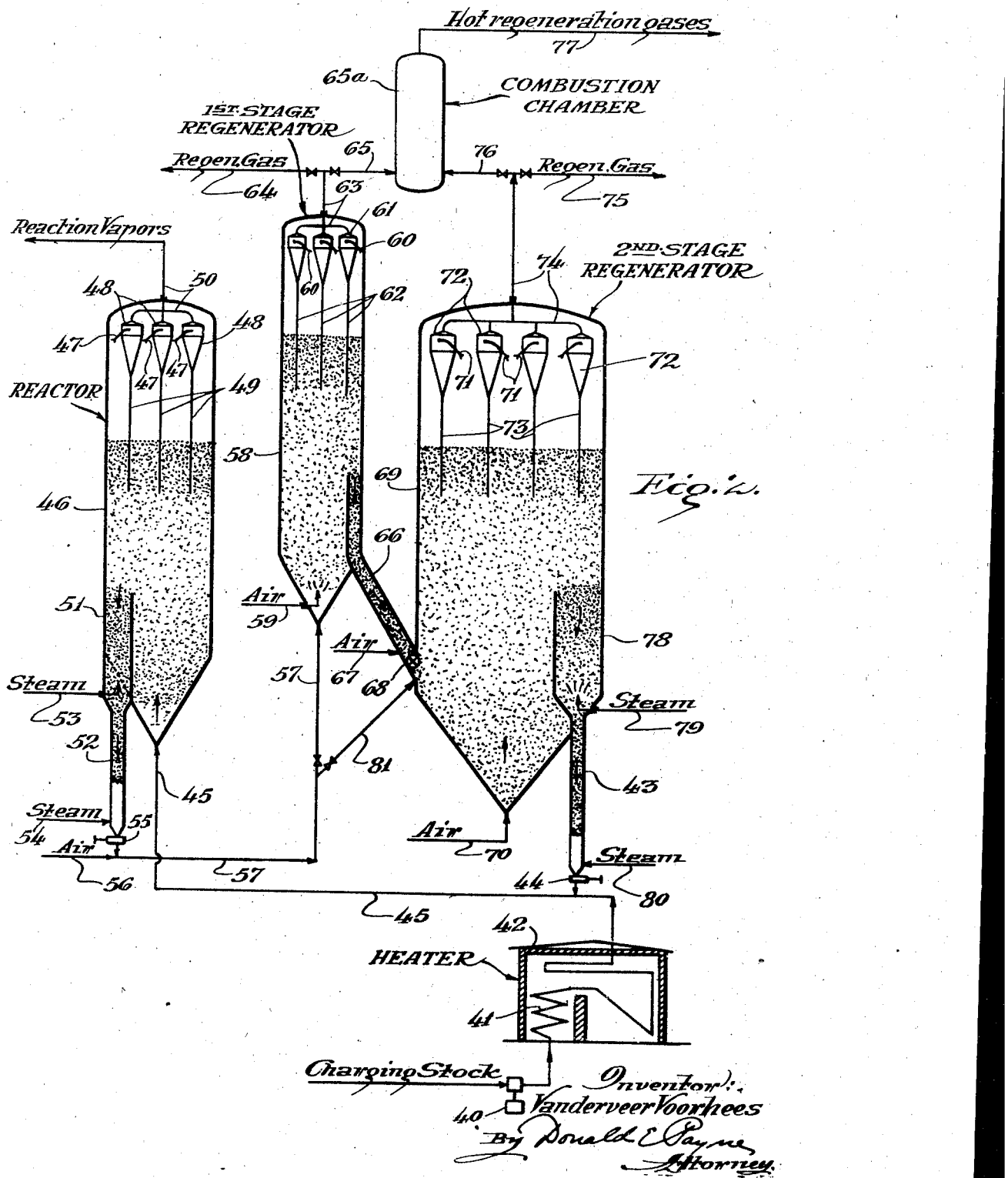

Patented Aug. 19, 1947

2,425,849

UNITED STATES PATENT OFFICE 2,425,849

POWDERED CATALYST REGENERATION AND RECOVERY

Vanderveer Voorhees, Homewood, Ill., assignor to Standard Oil Company, Chicago, Ill., a corporation of Indiana Application September 30, 1941, Serial No. 412,964

5 Claims. (Cl. 252—242)

1

This invention relates to the conversion of low quality naphtha, gas oils and heavier oils into high quality motor fuel by means of a suspended granulated or powdered catalyst which requires periodic regeneration. This is a continuation-in-part of my copending application Serial No. 368,-081 filed November 30, 1940, which issued as United States Patent No. 2,273,076 on February 17, 1942.

In powdered catalyst systems for the production of high quality motor fuel by cracking, aromatization, hydrogenation, dehydrogenation, isomerization, alkylation, isoforming, etc., it is usually necessary that the catalyst be periodically regenerated by burning carbonaceous deposits therefrom. The object of my invention is to effect substantially complete recovery of regenerated catalyst, i. e., to prevent the loss of regenerated catalyst fines from the system. A further object of my invention is to provide an improved method for absorbing the heat liberated in the regeneration step. Yet another object is to obtain more rapid regeneration of catalyst under conditions favoring increased catalyst life.

In large commercial installations it has heretofore been considered necessary to recycle large amounts of regenerated catalyst through a heat exchanger and back to the regeneration zone in order to prevent regeneration temperatures from exceeding safe limits. An object of my invention is to avoid the necessity of catalyst recycling and to avoid the necessity of using costly heat exchangers in the regenerator. A further object of the invention is to utilize a multi-stage powdered catalyst regeneration system wherein a substantially oxygen-free flue gas is produced in one stage and an oxygen-rich flue gas is produced in another stage so that these separate flue gas streams may be separately handled and utilized in a refinery. A further object is to minimize the amount of heat liberated in the regeneration zone itself and to provide an improved method whereby at least a substantial part of the carbon monoxide produced in one stage may be burned with an oxygen-rich flue gas from another stage in a zone outside of the regenerator.

A further object is to obtain more complete catalyst regeneration than has been possible in any commercial plants heretofore designed. A further object is to increase the yield and quality of a product produced in the conversion step by virtue of a more efficient catalyst regeneration system. Other objects will be apparent as the detailed description of the invention proceeds.

In practicing my invention the conversion is effected by means of a powdered catalyst which is maintained in a dense turbulent suspended catalyst phase. Spent catalyst from the conversion step is stripped for removal of hydrocarbon vapors. The stripped spent catalyst is then regenerated by burning carbonaceous deposits therefrom while the catalyst is suspended in an oxygen-containing gas such as air. This regeneration may be effected in a single stage or in a plurality of stages. In the single stage, or in the last stage if a plurality of stages are employed, the catalyst regeneration is effected while the catalyst is in dense phase turbulent suspension in a regeneration gas of which the oxygen content is about 10% to 20%. For example, air may be introduced into this regeneration zone in such amounts that the gases leaving the regeneration zone contain at least 10% and preferably about 15% of free oxygen.

The use of this high oxygen concentration brings about a more complete regeneration than has heretofore been possible and this in turn leads to higher yields of better quality products in the conversion step. The use of high oxygen concentrations would in ordinary systems lead to overheating in the regeneration step, particularly in the absence of heat exchangers or means for recycling catalyst through a cooler. The regeneration system is large enough to accommodate a sufficient amount of regeneration gas such as air so that all of the heat of combustion that is not absorbed by the catalyst itself and not lost by radiation is carried away by the regeneration gases themselves. In a 10,000 barrel per day unit this may require about three or five times the amount of air that has been heretofore required and a regeneration chamber of at least twice the diameter of previously designed chambers, but the use of air cooling in the regenerator makes possible the elimination of cooling coils and the previously employed system of recycling catalyst to a cooler and back to the regenerator. The use of from 100 to 400% excess air in the regenerator insures rapid regeneration, thus increasing the regeneration capacity of a given system. Furthermore, no CO or other reducing gases remain adsorbed on the catalyst, and the metal oxides are regenerated to a higher state of oxidation.

By employing a plurality of stages I may introduce sufficient air into the first stage so that its complete utilization in the combustion will not give rise to unduly high temperatures. The catalyst from this stage may then be introduced into a regenerator of sufficiently larger diameter so that the heat liberated in the remainder of the combustion will be substantially entirely absorbed in the regeneration gases themselves without exceeding safe regeneration temperatures.

The regeneration gases from this first stage contain substantial amounts of carbon monoxide. In the second stage the combustion products are chiefly carbon dioxide and the regeneration gases will contain a large excess of oxygen. By burning the flue gas from the first stage with the excess oxygen contained in the flue gas of the second stage in a zone outside of the regeneration chambers the problem of catalyst temperature control is minimized and a high temperature flue gas is produced which is particularly useful as a source of heat or power because of its high temperature level.

In the two-stage system most of the catalyst fines will leave the system with the gases from the first regeneration stage and since the amount of such gases is relatively small when compared with the gases leaving the second regenerator stage, I greatly simplify the problem of catalyst recovery. Such catalyst may be recovered by scrubbing with feed stock, by centrifugal separation, by filtration, by electrostatic precipitation or by other means but in any case the recovery system may be much smaller and less expensive than when used for treating the total volume of regeneration gases.

My invention will be more clearly understood from the accompanying drawings which form a part of the specification and in which:

Figure 1 is a diagrammatic flow sheet of one embodiment of the catalyst regeneration and recovery system used, and Figure 2 is a diagrammatic flow sheet of a catalytic conversion system together with another embodiment of the catalyst regeneration system used.

In the reaction step the catalysts are usually contacted with oil at a temperature of about 800 to 1100° F. under such conditions as to effect the desired conversion. After a certain on-stream or residence time in the reactor the catalyst becomes so coated with carbonaceous material that it must be regenerated. The carbonaceous material contains both carbon and hydrogen and since the regeneration is effected by combustion of the carbonaceous deposit, the regeneration gases contain carbon monoxide, carbon dioxide, nitrogen and steam with perhaps small amounts of sulfur dioxide where sulfur compounds were contained in the original charging stock.

The catalyst in the following examples is in powdered form with a particle size of about 10 to 100 microns. The invention is applicable to other catalyst sizes, e. g., 2 to 10 microns, provided only that the catalyst be of such size and density that it may be aerated and handled as a fluid in the manner herein described. When such powdered catalyst has been allowed to settle for ten minutes or more its bulk density may range from about 30 or 40 or more pounds per cubic foot. With slight aeration, i. e., with vertical gas or vapor velocities of about .05 to .5 feet per second, the catalyst is maintained in fluent form with a bulk density of about 20 to 35 pounds per cubic foot. When the catalyst is suspended in gases or vapors having a vertical velocity of about .5 to 4, preferably about 1½ to 2½ feet per second, the catalyst assumes a dense turbulent phase the density of which may range from about 10 to 25 or more pounds per cubic foot. I prefer to employ such gas or vapor velocities as to maintain this dense turbulent suspended catalyst phase at a density of about 15 to 18 pounds per cubic foot. This particular phase is characterized by such turbulence that uniform temperatures prevail in all parts of the system, i. e., the catalyst itself acts as a heat carrier for almost instantaneously distributing heat throughout the entire zone thereby eliminating any possible "hot spots" or local overheating. Above this dense turbulent suspended catalyst phase and in transfer lines the catalyst is in a dilute or dispersed phase the density of which may be as high as 4 or 5 pounds per cubic foot but is usually considerably less than 1 pound per cubic foot.

In the appended claims the expressions "dense turbulent suspended catalyst phase" and "dense turbulent suspended catalyst zone," are hereby defined to mean that phase and zone respectively in a powdered or finely-divided-solids catalyst system in which the bulk density is greater than 5 and less than 25 pounds per cubic foot and is maintained within these limits by upflowing gases or vapors for maintaining turbulence of the dense suspended catalyst material. There is disengagement of the gas or vapor from the bulk of the catalyst material in said dense phase whereby the catalyst material may be downwardly withdrawn from the dense turbulent suspended phase at substantially the same rate as catalyst is introduced thereto, the main catalyst withdrawal in such case being entirely separate from the withdrawal of gases or vapors. The dense turbulent suspended catalyst phase or zone is superimposed by a dilute or dispersed phase which is withdrawn from the top of the conversion zone. The density of the dilute phase may be as high as 4 or 5 pounds per cubic foot when catalyst is removed therewith instead of being downwardly removed but when the catalyst is downwardly removed the density of the dilute phase is considerably less than 1 pound per cubic foot. Thus the expression "dense turbulent suspended catalyst phase" is intended to include no more than a phase whose average bulk density is within the approximate range of 5 to 25 pounds per cubic foot with a dilute phase superimposed above it and with gases or vapors passing upwardly through it at such vertical velocities as to maintain turbulence and the stated bulk density.

In the cracking of heavy oils, gas oils and residuums, I may employ catalysts made by acid activating natural clays, bentonite or montmorillonite or I may use synthetic catalysts made generally of mixtures of active metal oxides such as silica, alumina, magnesia, silica gel, etc. For reforming and dehydrogenation I prefer to employ magnesia or alumina promoted by oxides of the V and VI group metals, especially vanadium, chromium and molybdenum.

In the reaction step the catalysts are usually contacted with oil at a temperature of about 800 to 1100° F. under such conditions as to effect the desired conversion. After a certain on-stream or residence time in the reactor the catalyst becomes so coated with carbonaceous material that it must be regenerated. The carbonaceous material contains both carbon and hydrogen and since the regeneration is effected by combustion of the carbonaceous deposit, the regeneration gases contain carbon monoxide, carbon dioxide, nitrogen and steam with perhaps small amounts of sulfur dioxide where sulfur compounds were contained in the original charging stock.

Referring to Figure 1 of the accompanying drawings, the spent catalyst from a conversion step may be introduced through line 10 at the base of regeneration chamber 11 into which air is injected through line 12. Preferably the catalyst particles range from about 10 to 100 microns in size although smaller or larger particle sizes may be used. The regeneration chamber is so designed that the vertical vapor velocity of the gases is about 1 to 4 feet per second, lower velocities being used for finely divided catalyst and higher velocities being used for coarser catalysts. With silica-alumina catalysts averaging about 50 microns in particle size, the vapor velocity may be about 2 to 3 feet per second. The gas contact time in the regenerator may be about 10 to 15 seconds and the catalyst residence time in the reactor due to the tendency of the catalyst to settle therein may be about 15 to 150 seconds or more. The temperature of regeneration is generally maintained between about 900 and 1200° F., preferably 1000 to 1100° F., depending largely on the thermal stability of the catalyst employed. External cooling, stage cooling or any other conventional means may be employed to keep the regeneration temperature within safe limits, but the control of introduced air is the preferred means for such control.

The hot regeneration gases and partially regenerated catalyst from chamber 11 may be introduced through line 13 to cyclone separator 14, or any other means may be employed for effecting the desired separation. Some of the partially regenerated catalyst may be withdrawn through lines 15 and 16 and return through line 17 for further use in the hydrocarbon conversion zone (not shown). The rest of the separated coarse catalyst particles is introduced through line 18 into second regeneration chamber 19 into which air is introduced by line 20. In this second regeneration chamber a considerable excess of oxygen is employed in order to insure complete regeneration of the coarser or larger catalyst particles. The hot regeneration gases and regenerated catalyst are then introduced through line 21 to cyclone separator 22 from which regenerated catalyst is returned through line 23 and line 17 for further use in the conversion system. Instead of cyclone separators, I may use other means for effecting catalyst separation such as screens, electrical precipitators, settlers, etc., all of which means are herein termed "mechanical."

Regeneration gases containing the finer residual catalyst particles are withdrawn from cyclone separator 14 through line 24 and introduced at a temperature of about 750 to 1050° F. into the base of stripper column 25. Regeneration gases containing an excess of oxygen which are discharged from the top of cyclone separator 22 may be discharged through line 26 through a suitable waste heat boiler, turbine, or other means for recovering heat energy therein. I may, however, close the valve in line 26 and introduce part or all of these gases through line 27 into line 24 leading to the base of stripper 25.

A portion of the gas oil or other feed stock which is to be charged to the conversion step of the system, preferably about 20 to 40% thereof, is introduced through lines 28 and 29 to the top of stripper column 25, preferably at about ordinary atmospheric temperature. As this portion of the feed stock descends through the stripper column counter-currently to the upflowing hot regeneration gases, the more volatile components of the feed stock are removed therefrom and are carried with the regeneration gases through line 30 to the base of scrubber tower 31. The amount so removed in the stripper may be from about 10 to 60%, more or less, usually about 25 to 35%. The initial boiling point of the remaining residual fraction is raised by about 100 to 200° F., i. e., to about 500° to 600° F. or higher. This remaining heavy non-volatile oil passes from the base of stripper column 25 through cooler 32 and line 33 to the top of scrubber 31. The amount of cooling depends upon the volatility of the charging stock and the relative amount thereof which is charged to the stripper. Usually I prefer to introduce the non-volatile oil through line 33 to the top of the scrubber at a temperature of about 100 to 200° F. In some cases the cooler may be unnecessary and the non-volatile oil may be simply by-passed through line 34 and line 33 to the top of the scrubber. Where all the heat in the gases in line 24 is not needed in stripper 25, I may by-pass a portion of the hot gases through line 24a directly to scrubber 31.

Another fraction of the feed stock, which may constitute all of the remaining feed stock, is introduced through line 35 to an intermediate point of scrubbing tower 31. This relatively cold charging stock condenses most of the hydrocarbons which were vaporized in stripper 25 and introduced into the base of the scrubber through line 30. Any uncondensed volatile hydrocarbons remaining in the gases in the upper part of the tower are absorbed by the non-volatile oil which is introduced through line 33. By using this relatively non-volatile stripped charging stock in the top of the scrubber tower 31 I may operate this tower at a sufficiently high temperature to effect the removal of steam as well as CO, $CO_2$, $N_2$, etc., through line 36. The hot oil leaving the base of the scrubber through line 37 will contain all of the catalyst removed from the regeneration gases introduced from line 24 and this hot catalyst-containing oil is then passed through line 38 to a suitable pipe still for heating to conversion temperatures. That portion of the feed stock which is not required for the stripping and scrubbing steps is by-passed directly through line 39 to line 38. In fact, line 35 may be closed entirely and all scrubbing in 31 be effected by the oil descending from the absorber zone in the top of 31.

Stripper column 25 and scrubber 31 may be provided with suitable baffles or bubble plates and it should be understood that instead of using simple towers as shown in the drawings, other suitable apparatus may be employed for effecting the desired stripping, scrubbing and absorption steps. It is essential, however, that the stripping step remove the more volatile components of the charging stock, that the scrubbing step condense the bulk of the vaporized hydrocarbons and that the absorption step prevent the losses of volatile hydrocarbons with exit regeneration gases. The stripped feed used in the absorber section at the top of 31 should contain substantially no constituents volatile at the conditions prevailing therein. The stripping step may be effected by indirect instead of direct contact in which case the catalyst is removed from the gases solely in the scrubbing zone instead of partly in the stripping zone. The absorption zone in any case will remove the final traces of catalyst as well as the more volatile hydrocarbons from the exit regeneration gases.

The present invention is not limited to the method of recovering catalyst fines as claimed in my copending application Serial No. 368,081 and any means whatsoever may be employed to accomplish this desired catalyst recovery. Regardless of the means employed, this recovery step may only have to be applied to a relatively small portion of the regeneration gases when the multistage regeneration system is used.

In Figure 2 I have illustrated a system wherein the catalyst recovery problem is relatively insignificant but which illustrates certain features of heat removal and temperature control. In very small units heat radiation losses are so great that it is sometimes necessary to actually supply heat to the regenerator in addition to the heat liberated by the combustion of carbonaceous deposits on the catalyst. In the system illustrated in Figure 1, the heat lost by radiation coupled with the heat absorbed by the catalyst and in the regeneration gases may keep regenerators 11 and 19 from exceeding safe temperature limits. For a plant designed for a 10,000 barrel per day through-put of hydrocarbon charging stock, reaction and regeneration vessels, etc., are of such magnitude that heat lost by radiation is relatively insignificant. Heretofore it has been proposed to keep regenerator temperatures within safe limits by recycling regenerated catalyst through a cooler and back to the regenerator but this practice is objectionable because of the expense of the necessary heat exchangers, equipment, etc., and because of the abrasion and attrition suffered by the catalyst undergoing such recycling. Heat exchangers in the regenerator interfere with the suspended turbulent dense phase catalyst phenomena and may thus be undesirable. In the embodiment of my invention illustrated in Figure 2, I have shown how regeneration temperatures may be controlled by the simple expedient of employing 400 to 500% more air than has been heretofore employed and redesigning the regeneration system to accommodate this large amount of air.

Referring to Figure 2, about 10,000 barrels per day of gas oil charging stock are forced by pump 40, through coils 41 in pipe still 42 wherein the charging stock is vaporized and heated to a transfer line temperature of about 850 to 1050° F., in any event to such a temperature that the reaction temperature is in the range of 850 to 1050 and preferably about 900 to 925° F., at a transfer line pressure of about 15 pounds per square inch gauge pressure. Hot catalyst, in this case and acid activated montmorillonite clay, from the standpipe 43 is introduced in amounts regulated by valve 44 into transfer line 45 and is carried by the charging stock vapors to reactor 46 which may be a cylindrical vessel about 12 or 13 feet in diameter and about 40 or 50 feet high. The weight ratio of catalyst-to-oil in this suspended catalyst stream in transfer line 45 may range from about 0.5:1 to 16:1 but is preferably about 4:1. The vertical vapor velocity in reactor 46 is preferably about 1½ to 2½ feet per second. The temperature in the reactor is uniform throughout, for example, about 900° F. The pressure may range from about 13 pounds per square inch at the base of the reactor to about 6 or 8 pounds per square inch at the top of the reactor. The gas contact time may be about 10 to 20 seconds.

Gases are removed from the dilute or dispersed catalyst phase in the top of the reactor through inlets 47 to cyclone separators 48 which may be connected in series or parallel, or both. Dip legs 49 return separated catalyst to a point below the dense phase level. Reaction products are taken overhead through lines 50 to a fractionation system for separating a motor fuel fraction from lighter and heavier products. The fractionation system per se forms no part of the present invention and it is, therefore, not shown in the drawings.

Once the desired level of the dense turbulent suspended catalyst phase in the reactor has been established, catalyst is withdrawn from this phase through stripping zone 51 and standpipe 52 at about the same rate as catalyst is introduced through transfer line 45. Stripping steam is introduced through line 53 and aeration steam through line 54 for removing hydrocarbons from the catalyst and maintaining this catalyst in fluent condition.

The stripped spent catalyst is discharged from the base of standpipe 52 in amounts regulated by valve 55 and is then picked up by carrier air from line 56 and carried through line 57 to the first stage regenerator 58. Air diluted with flue gas may be employed, but it is important that the amount of oxygen present in line 57 should be insufficient to cause overheating of the catalyst in the transfer line due to combustion. When processing 10,000 barrels per day of oil, 600,000 pounds per hour of catalyst containing about 6,000 pounds per hour of carbonaceous material, may be discharged from the base of standpipe 52 at a temperature of about 900° F. It may be picked up with about 6,500 pounds per hour of air from line 56 at a pressure of about 27 pounds per square inch gauge and at a temperature of about 250° F. resulting from the heat of compression. Combustion in the transfer line may raise the temperature of the catalyst and gases to about 950° F. at their point of introduction into regenerator 58. An additional 6,000 pounds per hour of air may be introduced at the base of the regenerator through line 59. The 12,500 pounds per hour of air thus employed will effect the combustion of sufficient carbonaceous material to increase the temperature of the catalyst and gases to almost 1000° F. provided, of course, that sufficient time is allowed for this combustion. Regenerator 58 may be about 6 feet in diameter and about 20 to 40 feet in height so that the vertical gas velocity therein will be of the order of about 1 to 2 feet per second and so that sufficient time will be allowed for substantially complete utilization of the oxygen.

Regeneration gases are withdrawn from the dilute phase from the top of this regenerator through inlets 60 to cyclones 61 from which separated catalyst is returned to the dense phase through dip legs 62. The oxygen-free regeneration gases which contain substantial amounts of carbon monoxide are withdrawn through lines 63 either through line 64 which may lead to a scrubber or catalyst recovery means or through line 65 which leads to combustion chamber 65a.

Catalyst is withdrawn from a point below the level of the dense turbulent suspended catalyst phase in regenerator 58 through conduit 66 which is aerated by a small amount of air or other gas introduced through line 67. Valve 68 controls the rate of catalyst removal so as to maintain a substantially constant level of dense phase in regenerator 58 and the removed catalyst is introduced directly into second-stage regenerator 69. Instead of direct introduction I may rapidly disperse the catalyst in regenerator 69 by means of a carrier gas or any other suitable injection means.

Since the catalyst enters regenerators 69 at about 1000° F. and since in this particular example the regenerator temperature is maintained at 1000° F., according to my invention, a sufficient amount of air is introduced through line 70 to carry away the heat liberated by the combustion of the remaining carbonaceous material in the catalyst. The amount of air required for this purpose far exceeds the amount necessary for effecting the combustion and in each case will, of course, depend upon the actual amount of carbonaceous material which was deposited on the original spent catalyst. In this particular example I introduce about 300,000 to 350,000 pounds per hour of air at the base of regenerator 69 the regenerator itself being about 34 to 36 feet in diameter and about 40 to 50 feet high. With such amounts of air, all of the heat liberated by burning the rest of the carbonaceous material from the catalyst is absorbed in the regeneration gases themselves and a sufficiently high oxygen concentration is maintained to effect substantially complete combustion of this material so that the catalyst is for practical purposes rapidly and completely regenerated. The regeneration gases are withdrawn from the top of regenerator 69 through inlets 71 to cyclone separators 72 from which the separated catalyst is returned to the dense phase through dip legs 73. The regeneration gases which are rich in oxygen and which ordinarily contain at least 10% of oxygen, are withdrawn through lines 74 and are either passed through lines 75 through heat exchangers, turbines or other means for recovering energy or introduced through line 76 to combustion chamber 65a wherein their contained oxygen burns the carbon monoxide from the regeneration gases introduced through line 65 to regenerator 58. Conventional combustion catalysts may be employed in chamber 65a and the gases which leave this chamber through line 77 are much hotter and, therefore, more valuable for supplying heat for power than the gases discharged through lines 64 and 75.

Catalyst is withdrawn from the dense turbulent catalyst phase in regenerator 69 through stripping zone 78 to standpipe 43. Stripping steam is introduced through line 79. The standpipe is aerated by steam introduced through line 80.

The temperature control may be employed by cutting regenerator 58 out of the system entirely and introducing spent catalyst through lines 57 and 81 directly into regenerator 69. In this case, however, it may be necessary to increase the amount of air introduced through line 70 not only to compensate for the air introduced through line 59 in the two-stage system but also to carry away the heat of combustion of carbon monoxide to carbon dioxide which is otherwise effected in chamber 65a of the two-stage system.

It should be understood that regenerator 69 may be provided with any suitable means for distributing the air in the base thereof other than the simple cone-shaped bottom shown in the drawings. Instead of using a single regenerator I may employ two or more regenerators connected in parallel. The foregoing data and conditions have been presented as an example of the operation with one type of stock and catalyst. The use of denser and coarser catalyst may require higher vapor velocities. Certain catalysts such as synthetic silica-alumina containing about 5 to 25% of alumina, may be regenerated at higher temperatures, for example 1,200 to 1,400° F., thereby reducing materially the size of the apparatus and amount of air to be handled.

From the above description many other modifications and alternative structures will be apparent to those skilled in the art. My invention has been described with reference to a specific example but it should be understood that said invention is not limited to the particular operating conditions therein set forth. An engineer skilled in the art can readily determine from the above description the operating conditions, reactor sizes, etc., required in any powdered catalyst system of this type.

I claim:

1. The method of regenerating powdered catalyst that has become spent because of carbonaceous deposits thereon which method comprises introducing said catalyst into a first regeneration zone, passing air upwardly through said zone at such a rate as to maintain a dense turbulent suspended catalyst phase therein and in such limited quantity as to maintain the temperature of said zone within safe limits and to produce carbon monoxide, removing initial products of combustion including carbon monoxide from said first zone, removing catalyst from said first zone at a point below the level of the dense catalyst phase therein, introducing said removed catalyst into a second regeneration zone, introducing relatively cool air into the second regeneration zone and passing it upwardly in said second regeneration zone at such a rate as to maintain a dense turbulent suspended catalyst phase therein and in such amounts as to abstract the heat of combustion therein in excess of heat lost by radiation and absorbed by catalyst within safe temperature limits, withdrawing a regeneration gas containing at least 10% oxygen from the top of said second zone, withdrawing regenerated catalyst from the dense phase of said second zone at a point below the level of said dense phase and stripping said withdrawn catalyst with an inert gas in order to remove any oxygen-containing gases therefrom.

2. The method of claim 1 which includes the further step of burning carbon monoxide in gases leaving the first zone by means of oxygen contained in regeneration gases leaving said second zone to provide a high temperature source of heat energy.

3. The method of regenerating solid catalyst material of small particle size that has become spent because of carbonaceous deposits thereon, which method comprises introducing said solid catalyst material into a first regeneration zone, passing an oxygen-containing gas upwardly in said zone at such a rate as to maintain a dense turbulent suspended solids phase therein at combustion temperature and in such limited quantity as to maintain the temperature of said zone within safe limits and to produce carbon monoxide, removing initial products of combustion including carbon monoxide from said first zone, removing catalyst from said first zone at a point below the level of the dense catalyst phase therein, introducing said removed catalyst into a second regeneration zone, introducing a relatively cool oxygen-containing gas into the second regeneration zone and passing it upwardly in the second regeneration zone at such a rate as to maintain a dense turbulent suspended catalyst phase therein at combustion temperature and in such amounts as to abstract the heat of combustion therein in excess of heat lost by radiation and absorbed by catalyst within safe temperature limits, withdrawing a regeneration gas containing at least 10% oxygen from the top of said second zone and withdrawing regenerated catalyst from the dense phase of the second zone at a point below the level of said dense phase.

4. The method of regenerating a spent powdered catalyst contaminated with carbonaceous deposits which method comprises suspending said catalyst in an upwardly flowing oxygen-containing gas stream in a first regeneration zone wherein the amount of oxygen is sufficient to cause only partial combustion of said deposits and to keep the temperature of the catalyst within safe limits, producing in said first zone a gas which is substantially free from uncombined oxygen but which contains substantial amounts of carbon monoxide, separating said gas from the bulk of said catalyst, introducing the bulk of said catalyst into a second regeneration zone, suspending said catalyst in an upwardly flowing stream of oxygen-containing gas in said second reaction zone while introducing a sufficient amount of said gas at relatively low temperature into said second regeneration zone to provide a substantial excess of uncombined oxygen in the regeneration gases leaving said zone, separating regenerated catalyst from oxygen-containing gases leaving said second zone and burning in a third zone carbon monoxide in gases from said first zone with uncombined oxygen in the regeneration gases leaving said second zone.

5. The method of regenerating solid catalyst material of small particle size that has become deactivated because of carbonaceous deposits thereon, which method comprises introducing said solid catalyst material into a first regeneration zone, passing an oxygen-containing gas upwardly in said zone at such a rate as to maintain a dense turbulent suspended solids phase therein at a temperature sufficient to effect partial combustion of carbonaceous deposits and in such limited quantity as to maintain the temperature of said zone within safe limits and to produce substantial amounts of carbon monoxide, removing from the upper part of said first zone gaseous combustion products including said carbon monoxide, removing partially regenerated catalyst from said first zone at a point below the level of the dense catalyst phase therein, introducing said removed catalyst into a separate second regeneration zone, introducing into the lower part of said second regeneration zone an amount of relatively cool oxygen-containing gas which far exceeds the amount necessary for effecting the combustion therein and passing said oxygen-containing gas upwardly therein at such a rate as to maintain a dense turbulent suspended catalyst phase at a temperature sufficient to effect further combustion of carbonaceous material and in amounts such as to abstract the heat of combustion which is in excess of heat lost by radiation and heat absorbed by the catalyst within safe temperature limits, withdrawing from the upper part of said second regeneration zone a gas stream rich in free oxygen, separately withdrawing regenerated catalyst from the dense phase in the second regeneration zone at a point below the level of said dense phase and conducting the carbon monoxide-containing gas withdrawn from the first regeneration zone and the free oxygen-containing gas withdrawn from the second regeneration zone away from said zones as separate streams to prevent any combustion of said carbon monoxide with said excess oxygen from liberating heat in either regeneration zone.

VANDERVEER VOORHEES.

REFERENCES CITED

The following references are of record in the file of this patent:

UNITED STATES PATENTS

| Number | Name | Date |
| --- | --- | --- |
| 2,065,643 | Brandt | Dec. 29, 1936 |
| 2,199,838 | Tyson et al. | May 7, 1940 |
| 2,248,196 | Plummer | July 8, 1941 |
| 2,253,486 | Belchetz | Aug. 19, 1941 |
| 2,261,151 | Fast | Nov. 4, 1941 |
| 2,265,694 | Carpenter | Dec. 9, 1941 |
| 2,273,075 | Weems | Feb. 17, 1942 |
| 2,320,273 | Gohr et al. | May 25, 1943 |
| 2,311,564 | Munday | Feb. 16, 1943 |
| 1,768,465 | Hartley | June 24, 1930 |
| 2,367,281 | Johnson | Jan. 16, 1945 |
| 2,371,619 | Hartley | Mar. 20, 1945 |
| 2,377,512 | Page, Jr. | June 5, 1945 |
| 2,387,798 | Kubicek et al. | Oct. 30, 1945 |